Dec. 15, 1953

A. C. FIELDS 2,662,608

ELECTROSTATIC PRECIPITATOR

Filed Aug. 23, 1950

INVENTOR
Arnold C. Fields
BY
ATTY.

Dec. 15, 1953  A. C. FIELDS  2,662,608
ELECTROSTATIC PRECIPITATOR
Filed Aug. 23, 1950  2 Sheets-Sheet 2
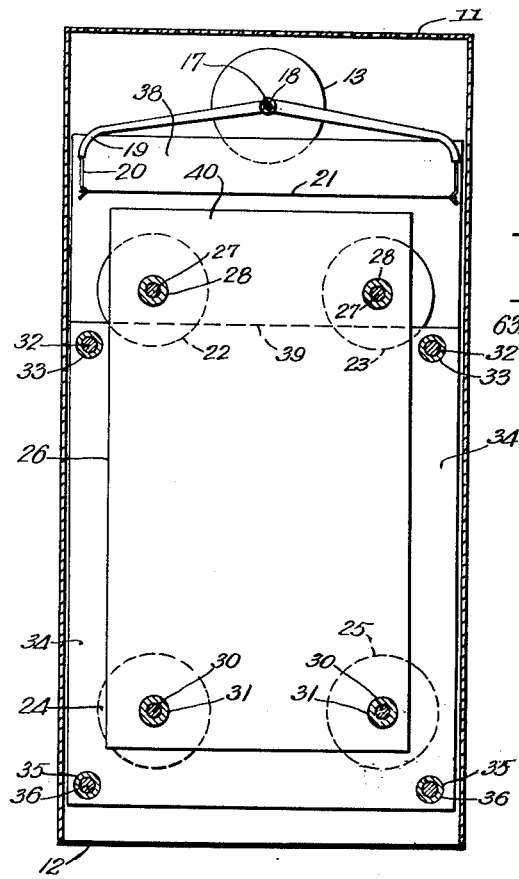
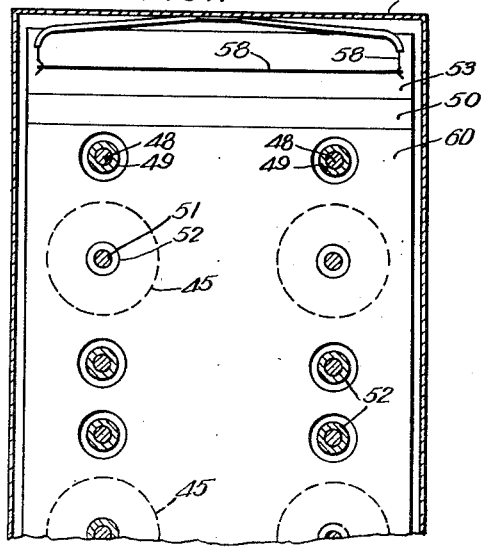
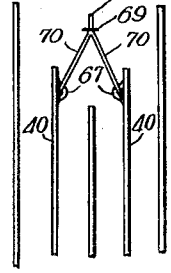
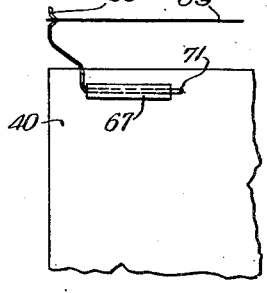
INVENTOR
Arnold C. Fields
BY Robert J. Palmer
ATTY.

Patented Dec. 15, 1953

2,662,608

UNITED STATES PATENT OFFICE 2,662,608

ELECTROSTATIC PRECIPITATOR

Arnold C. Fields, Medfield, Mass., assignor to Westinghouse Electric Corporation, East Pittsburgh, Pa., a corporation of Pennsylvania Application August 23, 1950, Serial No. 181,043

7 Claims. (Cl. 183—7)

This application relates to electrostatic precipitators for removing small foreign particles, such as dust, from gases, such as air.

The most widely used electrostatic precipitators for the removal of dust from air employ upstream ionizer chambers in which the dust entrained in the air is electrostatically charged, followed by downstream collector chambers containing collector plates upon which the charged dust is precipitated. The ionizer electrodes usually consist of positively charged, very fine wires spaced between relatively large, non-discharging electrodes. The non-discharging ionizer electrodes have heretofore been curved towards and away from the wires for the reason that the outer electrostatic flux lines converge towards the curved surfaces, providing more effective charging of the dust than where parallel flat plates are used for the non-discharging ionizer electrodes, since, as is well known, the ions which charge the dust follow such lines. Were it not for this advantage, flat plates would be preferred for the non-discharging electrodes since they are simpler, less expensive and easier to assemble and to clean.

This invention enables flat, parallel plates to be used as non-discharging ionizer electrodes without any decrease in dust charging effectiveness as compared to conventional curved electrodes. This is accomplished by continuing a pair of the collector plates which are charged oppositely to the wires, into the ionizer chamber past each wire whereby they form non-discharging ionizer electrodes, and by continuing a pair of collector plates which have the same polarity as the wires, into the ionizer chamber adjacent the wires whereby they repel the ions which flow towards the non-discharging ionizer electrodes, causing their flow lines to converge so as to concentrate the ions in a small area, thereby increasing the effectiveness of the charging of the dust.

In one embodiment of the invention, the positively charged ionizer electrodes are grounded, and the oppositely charged collector electrodes are given high charges, negative with respect to ground, whereby the dust particles which are blown off such plates, are charged and collected by a grounded metal wool collector located at the downstream end of the collector chamber. Other advantages of this construction are that the insulation problem is simplified, and a simple, inexpensive power pack providing a single, negative, high voltage may be used.

An object of the invention is to simplify the ionizer electrodes of electrostatic precipitators.

Another object of the invention is to enable flat metal plates to be used as non-discharging ionizer electrodes in an electrostatic precipitator for cleaning a gas, without any decrease in the effectiveness of the electrostatic charging of foreign particles entrained in the gas, as compared to conventional curved non-discharging, ionizer electrodes.

Another object of the invention is to operate an electrostatic precipitator with grounded, positively charged ionizer wires, and negatively charged dust precipitating electrodes for simplifying the insulation and power pack requirements.

The invention will now be described with reference to the annexed drawing, of which:

Fig. 5 is a sectional view along the lines 5—5 of Fig. 4;

Fig. 6 is a side elevation, in section, of another electrostatic precipitator embodying this invention;

Fig. 7 is a partial sectional view along the lines 7—7 of Fig. 6;

Fig. 8 is a partial end view of another embodiment of this invention showing an ionizer supported from charged collector plates, and Fig. 9 is a side view of Fig. 8.

Figure 1:
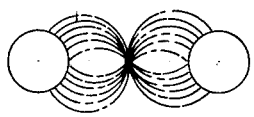
Fig. 1 is a diagrammatic view illustrating the flux lines of an electrostatic field between an ionizer wire and conventional tubular ionizer electrodes.

Referring now to Fig. 1 of the drawing, it will be noted that the flux lines of the electrostatic field between an ionizer wire and tubular ionizer electrodes, converge towards the tubular electrodes causing a concentrated field of limited extent through which the gas to be cleaned, flows.

Figure 2:
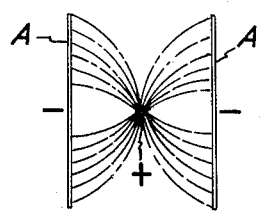
Fig. 2 is a diagrammatic view illustrating the flux lines of the electrostatic field which ordinarily would exist when flat, non-discharging ionizer electrodes are used with ionizer wires.

Referring now to Fig. 2 of the drawing, with the same spacings and the same voltage, but with flat plates A instead of tubular ionizer electrodes, the flux lines of force of the electrostatic field are spread out over such a distance in the direction of gas travel, that the field is not nearly so concentrated as in the case of Fig. 1.

Figure 3:
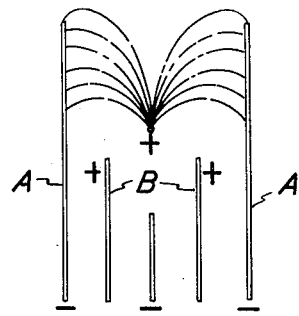
Fig. 3 is a diagrammatic view illustrating the flow lines of the ions flowing towards the non-discharging ionizer electrodes when ionizer electrodes embodying this invention, are used.

Referring now to Fig. 3 of the drawing, the outer plates A correspond to the plates A of Fig. 2, but in Fig. 2, the collector plates B having the same charge as the ionizer wire, are extended into the ionization zone with their upper edges adjacent to the wire. This causes the ions flowing between the wire and the plates A below the wire to be repelled so that they are crowded into the space above the wire causing a concentrated field in that space. The upper ends of the plates A are terminated so that the upper flux lines curve back towards its upper edge. These actions provide the equivalent as far as dust charging is concerned, of the construction of Fig. 1, but having the advantages that non-discharging ionizer electrodes separate from collector plates, are not required, and that the electrodes are easier to wash than the equivalent tubular ones.

Figure 4:
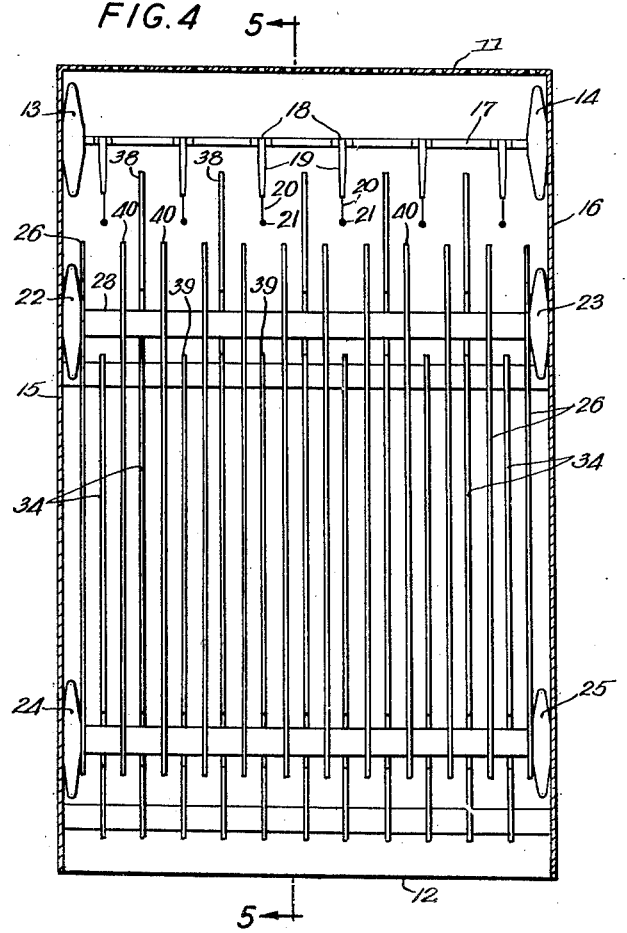
Fig. 4 is a side elevation, in section, of an electrostatic precipitator embodying this invention.

Referring now to Figs. 4 and 5 of the drawing, the precipitator casing has an air inlet 11 and an air outlet 12. The disc-shaped insulators 13 and 14 are attached at their outer sides to the inner sides of the metal side walls 15 and 16 of the casing, and have the metal rod 17 extending between and attached to their inner sides. The metal ionizer wire supports 18 are attached at equally spaced positions to the rod, and have the downwardly extending metal arms 19 with flexible spring wires 20 attached to their ends, and between which the ionizer wires 21 extend.

The disc-shaped insulators 22 and 23 are attached at their outer sides to the inner sides of the side walls 15 and 16 just below the insulators 13 and 14, and serve with the lower disc-shaped insulators 24 and 25 attached to the inner sides of the side walls just above the outlet 12, to support the collector plates 26. The metal rods 27 with spacers 28 thereon, are attached to and extend between the inner sides of the insulators 22 and 23. The spacers extend between and contact the collector plates 26 around smaller openings therein through which the rods 27 extend. The metal rods 30 with the metal spacers 31 thereon, are attached to and extend between the inner sides of the insulators 24 and 25. The spacers 31 extend between and contact the collector plates 26 around smaller openings therein through which the rods 30 extend.

The metal rods 32 with the metal spacers 33 therein are attached to and extend between the inner sides of the casing walls 15 and 16 just below the rods 27. The spacers 33 extend between and contact the grounded collector plates 34 around smaller openings therein through which the ends 32 extend. The metal rods 35 with the spacers 36 thereon are attached to and extend between the inner sides of the casing walls 15 and 16 just below the rods 30. The spacers 37 extend between and contact the grounded collector plates 34 around smaller openings therein through which the rods 35 extend.

The portions of the side walls 15 and 16 extending between the rods 33 and 35, serve as grounded collector plates, and their portions adjacent the outer ionizer wires 21 serve as non-discharging, grounded, ionizer electrodes. The second grounded collector plate 34 from the wall 15, the second grounded collector plate 34 from the wall 16, and every second collector plate 34 therebetween, have the upper portions 36 which extend upwardly past the ionizer wires and which serve as non-discharging, grounded, ionizer electrodes. The upper ends 39 of the other collector plates 34 terminate adjacent the rods 32. Thus, as illustrated by Fig. 4, each ionizer wire 29 is located midway between collector plate portions which serve as non-discharging ionizer electrodes.

The upper ends 40 of the insulatedly supported collector plates 26, extend into the ionization zone substantially above the upper ends 39 of the grounded collector plates 34, which do not have upper portions forming non-discharging ionizer electrodes, and so close to the ionizer wires as to distort the electrostatic field between the wires and the collector plate portions forming non-discharging ionizer electrodes, as illustrated by Fig. 3 of the drawing.

The rods 27 extend through clearance openings in the grounded plate portions 38. The rods 30 extend through clearance openings in the plates 34.

The rods 17 and 27 are connected to a +12 kv. terminal of a direct current power supply, to the negative terminal of which the grounded metal casing of the precipitator is connected. This provides a 12 kv. difference in potential between the ionizer wires and the non-discharging ionizer electrodes, and between the insulatedly supported and the grounded collector plates.

In operation, the air passing the ionizer electrodes is ionized, causing the dust particles entrained in the air to be given positive electrostatic charges. The positively charged dust then is precipitated upon the grounded collector plates.

In the embodiment of the invention illustrated by Figs. 6 and 7 of the drawing, the metal side walls 41 and 42 have the metal angles 43 on which are supported a collector cell comprising the end plates 44 of insulating material having horizontal out-turned lower portions which are seated on the angles, and the outer ends of which contact the side of the casing.

The disc-shaped insulators 45 are attached to the metal brackets 46, the ends of which are attached to the end plates 44 and to the metal rods 48.

The rods 48 have the spacers 49 thereon which extend between and contact the grounded, positively charged collector plates 50 around smaller openings therein through which the rods 48 pass.

The rods 51 with the spacers 52 thereon are attached to the inner sides of the insulators 45 and extend therebetween. The spacers 52 extend between and contact the negatively charged collector plates 53. The rods 48 extend through clearance openings in the plates 53. The rods 51 extend through clearance openings in the plates 50.

The perforated, metal, upper wall 54 of the casing forming the air inlet of the precipitator, is hinged at 55 so that it can be swung upwardly, and has the metal ionizer wire supports 56 attached to its underside. The supports 56 have the spring wires 58 attached thereto for supporting therebetween the ionizer wires 59.

The upper ends of the end, negatively charged, collector plates 53 and of alternate plates 53 therebetween, extend upwardly past the ionizer wires and form the non-discharging ionizer electrodes. The upper ends 60 of the other plates 53 terminate adjacent the rods 48.

The upper ends of the grounded collector plates 50 extend beyond the upper ends 60 of the collector plates 53, and sufficiently close to the ionizer wires as to distort the electrostatic field between same and the non-discharging ionizer electrodes as illustrated by Fig. 3 of the drawing.

The power supply 62 comprises a transformer 63 having a secondary winding 64 grounded at one end and connected at its other end to the filamentary cathode of the rectifier tube 65, the plate of which is connected to, and delivers —12 kv. to the collector plates 50, the filament of the tube obtaining its voltage from a tap on the secondary winding. The capacitor between the collector plates serves as the filtering capacitor, although an external capacitor may be added if desired.

The positive, grounded terminal of the power supply is connected to the ionizer wires and to the collector plates 50, and the terminal is connected to the collector plates 53 so that there is a 12 kv. difference in potential between the ionizer wires and the plates 53, and between the collector plates 50 and 53.

The metal wool cell 66 is supported in the precipitator casing across the air outlet 67, the hinged door 68 providing access to this cell for its removal and replacement. The cell 66 is grounded to the casing.

In the operation of the precipitator illustrated by Figs. 6 and 7, the air passing between the ionizer electrodes is ionized so that positive electrostatic charges are given to the dust particles entrained therein. The charged dust precipitates on the negatively charged collector plates 53. Those particles which are blown off the collector plates 53 thus have negative charges and deposit upon the grounded filaments of the metal wool cell 66.

Since the non-discharging ionizer electrodes are flat and extend parallel the air flow, they are easily washed by water sprayed into the precipitator, through its air inlet. There are no downstream sides which are not contacted by the water, and which prevent the water from contacting the plate surfaces immediately downstream thereof as in the case of conventional non-discharging ionizer electrodes having curved surfaces. It is also apparent that the manufacturing, assembly and servicing costs of electrostatic precipitators may be reduced through the use of this invention.

Since the charged collector plates 40 and the ionizer wires 21 of the precipitator illustrated by Figs. 4 and 5 of the drawing have the same polarity and are at the same potential, instead of supporting the wires from the insulators 13 and 14, they may be supported from the charged plates as illustrated by Figs. 8 and 9 of the drawing. The adjacent plates 40 have horizontally aligned, oppositely faced depressions 67 formed therein, near their upper and outer edges. There are two supports for each ionizer wire, each being a relatively large wire of spring metal bent back on itself at 68 and having an ionizer wire 69 looped therearound and having downwardly extending portions 70 sprung apart and having horizontally extending lower ends 71 which are tensioned in the depressions 67.

These wire supports can easily be snapped into place on the plates 40, and easily and quickly removed, yet will maintain the wires securely in position. This construction also further reduces the cost of the ionizer electrode assembly.

While embodiments of the invention have been described for the purpose of illustration, it should be understood that the invention is not limited to the exact apparatus and arrangement of apparatus illustrated, since modifications thereof may be suggested by those skilled in the art without departure from the essence of the invention.

What I claim as my invention is:

1. An electrostatic precipitator having a gas inlet and a gas outlet, comprising an ionizer wire within said precipitator adjacent said inlet, five equally spaced-apart substantially parallel collector plates between said wire and outlet, the outermost of said plates having upstream portions extending past said wire on opposite sides thereof towards said inlet and forming non-discharging ionizer electrodes, the central one of said plates extending in alignment with said wire and having an upstream edge spaced a substantial distance from said wire, the other two of said plates having upstream edges extending substantially beyond said edge of said central plate towards said inlet and extending parallel to and adjacent said wire, means for insulating said other plates and wire from said outermost and central plates, and means for connecting said other plates and wire to a terminal having one polarity of a direct current source, and for connecting said outermost and central plates to a terminal of said source having the opposite polarity.

2. An electrostatic precipitator as claimed in claim 1 in which the wire is supported from the upstream edges of the other plates.

3. An ionizer having an inlet for gas to be ionized, a pair of spaced-apart, parallel, flat metal plates having upstream edges adjacent said inlet, an ionizer wire supported midway between said plates and insulated therefrom, means for connecting said wire to a terminal having one polarity of a direct current source, and for connecting said plates to a terminal of said source having the opposite polarity, for ionizing the gas between said plates and wire and for causing ions to flow between said plates and wire, and means for repelling the ions flowing from said wire towards said plates comprising a pair of electrodes located downstream of said wire with respect to gas flow through said inlet, said electrodes being located on opposite sides of and adjacent said wire and having upstream edges parallel to said wire, and being electrically connected to said wire.

4. An ionizer as claimed in claim 3 in which the wire is supported from said electrodes.

5. An electrostatic precipitator comprising a casing having a gas inlet and a gas outlet, a pair of spaced-apart, parallel, flat, metal collector plates having upstream edges adjacent said inlet, an ionizer wire supported midway between said plates and insulated therefrom, a central collector plate parallel to said plates and located midway therebetween in alignment with said wire, a second pair of collector plates insulated from said central plate and the plates of said first pair, said central plate being electrically connected to said plates of said first pair, said plates of said second pair being located midway between said central plate and said plates of said first pair, means connecting said wire and said plates of said second pair electrically to said casing, and means for connecting said casing and said plates of said first pair to opposite polarity terminals of a direct current source.

6. An electrostatic precipitator comprising a metal casing having a gas inlet and outlet, a perforated metal inlet plate connected across said inlet and attached to said casing, a pair of spaced-apart non-discharging ionizer electrodes insulatedly supported from said casing adjacent said plate, and an ionizer wire supported from and electrically connected to said plate and midway between said electrodes.

7. An electrostatic precipitator as claimed in claim 6 in which the casing contains a pair of collector plates, and in which the non-discharging ionizer electrodes form the upstream portions of the collector plates.

ARNOLD C. FIELDS.

References Cited in the file of this patent

UNITED STATES PATENTS

| Number | Name | Date |
|---|---|---|
| 1,343,285 | Schmidt | June 15, 1920 |
| 2,129,783 | Penney | Sept. 13, 1938 |
| 2,255,677 | Penney | Sept. 9, 1941 |
| 2,556,982 | Roos et al. | June 12, 1951 |

FOREIGN PATENTS

| Number | Country | Date |
|---|---|---|
| 776,115 | France | Oct. 22, 1934 |